June 28, 1938.  H. B. DODGE  2,121,862
HEAVY DUTY VEHICLE CONSTRUCTION
Filed Feb. 25, 1937  2 Sheets-Sheet 1
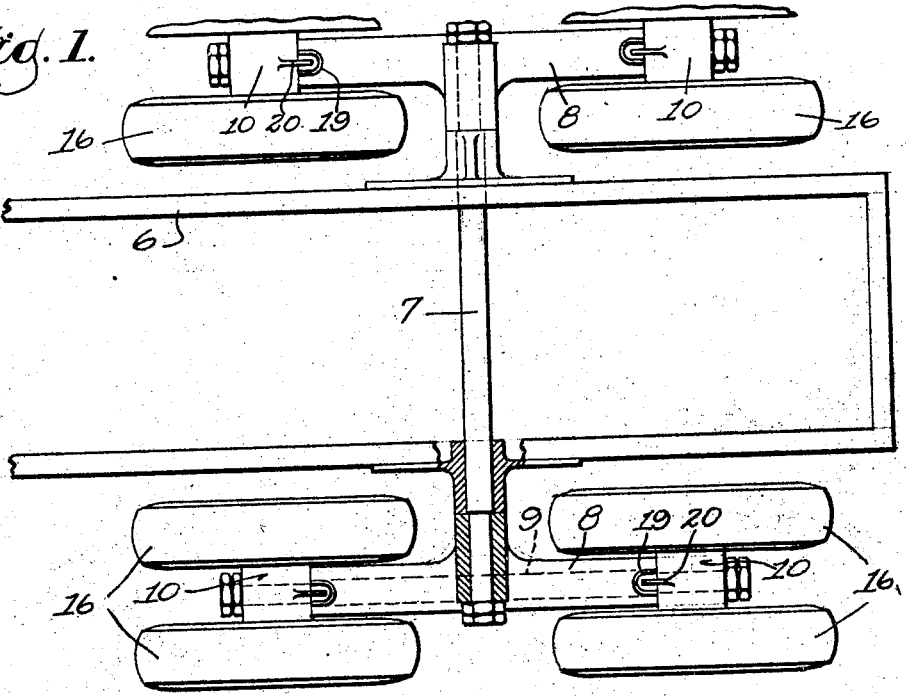
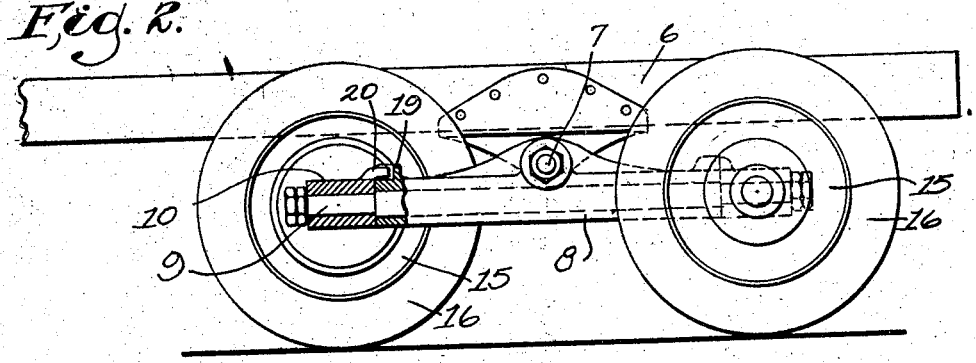
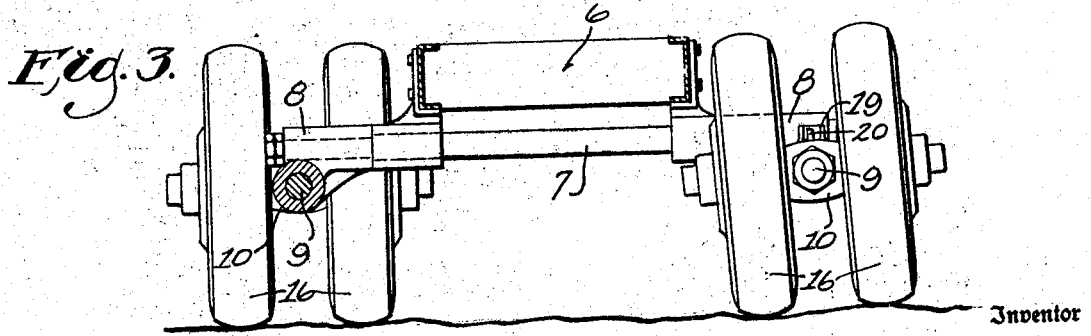
Inventor
Harry B. Dodge
By Wheeler, Wheeler & Wheeler
Attorneys June 28, 1938.  H. B. DODGE  2,121,862

HEAVY DUTY VEHICLE CONSTRUCTION

Filed Feb. 25, 1937  2 Sheets-Sheet 2

Harry B. Dodge, Inventor

By Wheeler, Wheeler and Wheeler, Attorneys

Patented June 28, 1938

2,121,862

UNITED STATES PATENT OFFICE 2,121,862

HEAVY DUTY VEHICLE CONSTRUCTION

Harry B. Dodge, Clintonville, Wis., assignor to The Four Wheel Drive Auto Company, Clintonville, Wis., a corporation of Wisconsin Application February 25, 1937, Serial No. 127,679

5 Claims. (Cl. 280—81)

This invention relates to improvements in heavy duty vehicle constructions.

It is the primary object of the invention to provide, in a single truck organization, for the balanced distribution of a heavy vehicle load upon eight pneumatic tires so organized that any one of the tires may be replaced individually and braking pressure may be applied to all eight of the tires separately, and any tire may move vertically either upwardly or downwardly with reference to any other tire or set of tires in the group.

In an ordinary two axle bogey construction each axle is in one piece and the wheel bearings are mounted directly thereon. This permits of no flexibility or equalization of load, and when the vehicle traverses muddy roads or encounters obstacles, one tire of each pair may be obliged to carry the entire load with the result that excessive wear is occasioned. It is my object to arrange eight tires in pairs in a single truck assembly, as for the support of a heavy duty trailer, and to permit each of the pairs to oscillate independently, but only to a limited degree, with reference to the other tires, thus assuring equalization of the load within the permissible limits which the wheels are adapted to carry.

In the drawings:

Figure 1 is a plan view partially broken away to expose the bearing structure and illustrating a springless eight wheel truck assembly embodying this invention.

Figure 2 is a view of the same device largely in side elevation but partially broken away.

Figure 3 shows the same device in rear elevation, partially broken away.

Like parts are identified by the same reference characters throughout the several views.

Figure 4:
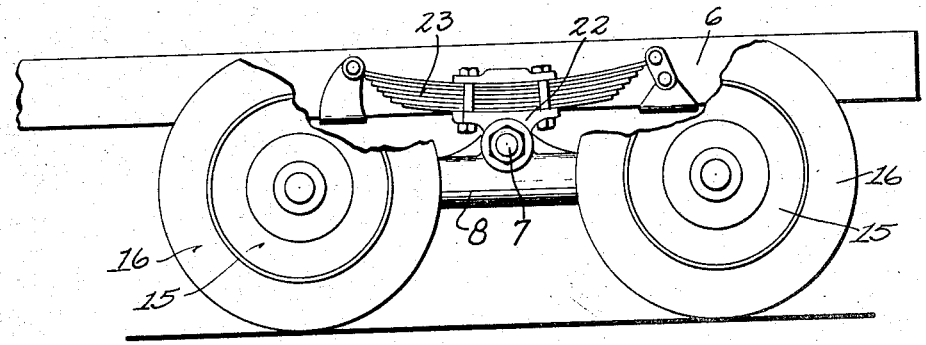
Figure 4 shows a modified embodiment of the invention largely in side elevation but partially broken away.
Figure 5:
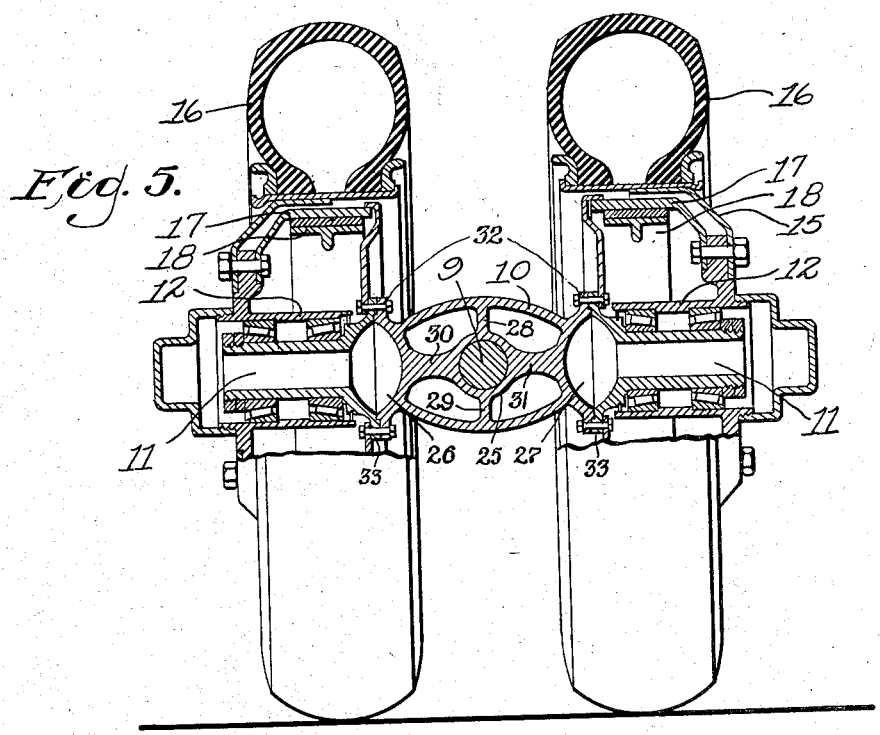
Figure 5 is an enlarged detail view taken in cross section through a wheel pair as used in either of the embodiments of the invention.

A vehicle frame 6 carries a supporting cross shaft 7 which projects laterally beyond the sides of the frame to provide a fulcrum for the heavy castings 8 through which extend longitudinal shafts 9.

Fulcrumed on each end of the shaft 9, in turn, are the oscillatable axle carriages 10 which carry the axle skeins 11 and the bearings upon which the hubs 12 and the wheels 15 are mounted.

Each wheel is preferably provided individually with a replaceable pneumatic tire casing 16 retained thereon in any desired manner. Each wheel is also preferably provided individually with a brake drum 17 and brake 18. Each of the axle carriages 10 preferably comprises a hollow shell having a central bearing sleeve 25, cup-shaped heads 26 and 27, and webs 28, 29, 30 and 31 connecting the bearing sleeve 25 with the upper and lower portions of the shell and with the cup-shaped heads 26 and 27, respectively.

The cup-shaped heads terminate in annular flanges 32, to which the complementary flanges 33 of the axle skeins are secured.

There are parts which interact between the axle carriages 10 and the oscillatory bogey casting 8 to limit the degree to which the axle carriages may oscillate upon shafts 9. Preferably I cast on the bogey members 8 a semi-annular ridge at 19, the two ends of which constitute stops between which a lug 20 on the axle carriage 19 is movable. This arrangement prevents the axle carriage from tilting so far as to impose on any given wheel a load which it is unadapted to bear, most wheels being designed to receive radial load primarily. Fig. 3 shows at the right how one of the axle carriages has been tilted due to the fact that the outer tire 16 is passing over a bump in the road surface while the inner tire 16 of this pair is in a hollow. By permitting this tilting movement the load is equalized as between these two tires. If the axle carriage 10 were rigid on shaft 9, the outer tire 16 of this pair would carry the entire load transmitted through such carriage.

As between the forward and rearward carriages at either side of the vehicle, the movement of the casting 8 upon the cross shaft 7 provides equalization.

In the construction shown in Fig. 4 the cross shaft 7, instead of being mounted directly in brackets on the frame as in Figs. 1, 2, and 3, is provided with a spring seat casting 22 which supports the frame through the usual springs 23 having conventional hangers connected with the frame. The construction is otherwise identical with that already described.

Frequently dual wheels have been used in bogey constructions, both wheels being mounted in close proximity on a single axle. In any such construction it is difficult, if not impossible, to replace the innermost tire casing without first removing the outer tire casing of any wheel pair. In the present construction there is plenty of clearance afforded for the replacement of either tire casing individually. An additional advantage is found in the increased stability and equalization of load which results from spacing the wheels somewhat apart at opposite sides of the longitudinally extending shaft 9 upon which the axle carriage 10 is fulcrumed.

Preferably, the shaft 9 will be located to fix the fulcrum axis of the axle carriages 10 substantially midway between the treads of the inner and outer wheels of the forward and rearward pairs mounted thereon. The transverse axle 7 will preferably be located substantially midway between the axle skeins of the forward and rearward pairs.

One additional advantage having to do with the individual braking of the several wheels is attributable to the fact that each wheel is independently rotatable and has its own independent brake. As compared with a dual wheel construction, this not only gives additional braking surface but it renders the braking action more dependable in that the wheels are now somewhat separated and consequently a slippery spot encountered by one wheel is not so apt to be encountered simultaneously by the other wheel of the pair. Thus, even though the brake is ineffective as applied to the one wheel which may be on a slippery surface, the brake applied to the other wheel of the pair is quite apt to be effective and thus to give more dependable control under adverse conditions.

I claim:

1. The combination with a vehicle frame, of frame supporting means providing longitudinally extending bearing members at opposite sides of the frame, axle carriages pivoted on the respective bearing members at the forward and rearward ends thereof and each provided with inwardly and outwardly directed axle elements, wheels mounted on the respective axle elements to receive the distributed load of the frame, and means interacting between the axle carriages and the bearing members for limiting the oscillation of the carriages.

2. The combination with a vehicle frame of a transverse bogey shaft, a bogey member mounted on said shaft and provided with a longitudinally projecting bearing, an axle carriage member fulcrumed on said bearing, wheels operatively mounted on said axle carriage member, and means restraining said carriage member against undue oscillation on said bearing with respect to said bogey member, said means comprising spaced lugs on one of said members, and an intervening lug connected with the other member, and engageable alternatively with said spaced lugs at the extremities of relative movement between said members.

3. The combination with a bogey member and a wheel carriage member, a frame operatively connected with said bogey member, wheels operatively mounted upon said carriage member, and means pivotally connecting said members, of means for restraining said members against undue oscillatory displacement respecting each other, said means comprising a semi-circular rib formed upon one of said members and having its ends extending close to the other of said members, an intervening lug carried by said other member and disposed between the ends of said rib to contact said rib ends as stops to define the extent of relative movement between said members.

4. In a device of the character described, a wheel carriage comprising a hollow shell formed at its sides to provide heads, and provided centrally with a bearing sleeve extending between said heads, web means integrally connecting said sleeve with said shell and said heads, and axle skeins provided with heads complementary to said first mentioned heads, and in operative connection therewith.

5. In a device of the character described, a wheel carriage comprising the combination with a longitudinally disposed bearing sleeve of an enclosed shell integral with said sleeve, and centrally spaced therefrom; webs extending in a generally upright direction between said shell and bearing sleeve and integrally connected thereto, cup-shaped head members provided with annular flanges disposed substantially parallel to each other to opposite sides of the sleeve, and integrally connected with said shell, webs extending in a generally horizontal direction between said cup-shaped heads and said sleeve and integrally connected thereto, and axle skeins provided with annular flanges complementary to the flanges of said cup-shaped heads and unitarily connected therewith.

HARRY B. DODGE.